United States Patent
Kanesaka et al.

(10) Patent No.: US 10,465,594 B2
(45) Date of Patent: Nov. 5, 2019

(54) COOLING CONTROL DEVICE

(71) Applicant: SUBARU CORPORATION, Tokyo (JP)

(72) Inventors: Yoshiyuki Kanesaka, Tokyo (JP); Tatsunosuke Motomura, Tokyo (JP); Shogo Yoshimi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/977,352

(22) Filed: May 11, 2018

(65) Prior Publication Data
US 2019/0048782 A1 Feb. 14, 2019

(30) Foreign Application Priority Data
Aug. 9, 2017 (JP) .................. 2017-154290

(51) Int. Cl.
*F01P 7/14* (2006.01)
*F01P 5/12* (2006.01)
(Continued)

(52) U.S. Cl.
CPC .................. *F01P 7/14* (2013.01); *F01P 3/18* (2013.01); *F01P 5/12* (2013.01); *F16K 31/04* (2013.01);
(Continued)

(58) Field of Classification Search
CPC .......... F01P 7/14; F01P 2007/146; F01P 7/16; F01P 7/165; F01P 5/12; F01P 11/14;
(Continued)

(56) References Cited

U.S. PATENT DOCUMENTS 6,164,248 A 12/2000 Lehmann
2017/0362993 A1* 12/2017 Seo .......................... F01P 11/14

FOREIGN PATENT DOCUMENTS

JP H07-266918 A 10/1995
JP H10-103559 A 4/1998
(Continued)

OTHER PUBLICATIONS

Japanese Office Action dated Nov. 20, 2018 for Application No. 2017-154290.

*Primary Examiner* — Jacob M Amick
(74) *Attorney, Agent, or Firm* — Troutman Sanders LLP (57) ABSTRACT

A cooling control device includes a switching valve, coolant transporting units, an electric motor, a function determination unit, and a first controller. The switching valve has coolant outlets through which a coolant flows. The coolant transporting units are disposed in contact with the switching valve and connected to or shut off from the coolant outlets. The electric motor switches between connecting and shutting off the coolant outlets and the coolant transporting units by operation of the switching valve. The function determination unit detects decrease in an operating function of the switching valve. The first controller sets an amount of current applied to the electric motor to operate the switching valve after the operating function of the switching valve is determined to be decreased, to be larger than an amount of current applied to the electric motor to operate the switching valve when the switching valve operating function is not decreased.

13 Claims, 6 Drawing Sheets

(51) Int. Cl.
*F16K 31/04* (2006.01)
*F01P 3/18* (2006.01)

(52) U.S. Cl.
CPC ..... *F01P 2007/146* (2013.01); *F01P 2023/08* (2013.01)

(58) Field of Classification Search
CPC .... F01P 11/18; F01P 2023/08; F01P 2023/00; F16K 31/04
See application file for complete search history.

(56) References Cited

FOREIGN PATENT DOCUMENTS

| | | | |
|---|---|---|---|
| JP | 2000-034922 | A | 2/2000 |
| JP | 2006-336658 | A | 12/2006 |
| JP | 2009-030752 | A | 2/2009 |
| JP | 2014-9668 | A | 1/2014 |
| JP | 2015-059453 | A | 3/2015 |

* cited by examiner

COOLING CONTROL DEVICE

CROSS-REFERENCE TO RELATED APPLICATIONS

The present application claims priority from Japanese Patent Application No. 2017-154290 filed on Aug. 9, 2017, the entire contents of which are hereby incorporated by reference.

FIELD OF TECHNOLOGY

The present invention relates to a cooling control device for delivering coolant to a part to be cooled.

BACKGROUND

An example of a cooling control device for delivering coolant to a part to be cooled is described in Japanese Unexamined Patent Application Publication (JP-A) No. 2014-9668. In the cooling control device described in JP-A No. 2014-9668, an engine is the part to be cooled. The cooling control device described in JP-A No. 2014-9668 has a water pump, a thermostat, a radiator, an electronic control device, and a switching valve. The switching valve includes a cylinder portion, an input port provided in the cylinder portion, and an output port. The input port is connected to a discharge port of the water pump via a water jacket of the engine. The output port is connected to an intake port of the water pump. Further, a housing chamber is provided in the cylinder portion, and a valve body is disposed in the housing chamber in a movable manner. A spring is provided for biasing the valve body away from a valve seat. An electromagnetic coil is provided that presses the valve body against the valve seat, against the elastic force of the spring. A flow passage is provided through the valve body.

In the cooling control device described in JP-A No. 2014-9668, when the temperature of the engine is lower than the warming-up temperature, cooling water exiting from the water jacket of the engine is drawn into the water pump through the switching valve and the thermostat. If the temperature of the engine is greater than or equal to the warming-up temperature, the cooling water exiting the water jacket of the engine is allowed to pass through the radiator to the thermostat.

The quantity of foreign matter deposited on the surface of the core of the electromagnetic coil is then estimated. When the quantity of foreign matter deposited is equal to or less than a threshold value, current is conducted into the electromagnetic coil. As a result, the valve body is pressed against the valve seat by an attractive force of the electromagnetic coil. Also, cooling water of the input port flows to the output port through a circulation portion of the valve body.

When the amount of foreign matter deposited exceeds the threshold value, conduction of current into the electromagnetic coil is cut off to move the valve body away from the valve seat. Consequently, the flow area for cooling water flowing in the cylinder portion is enlarged, thereby increasing the flow rate and water pressure of the cooling water passing through the switching valve. In this way, foreign matter deposited on the core can be washed away.

SUMMARY

An aspect of the present invention provides a cooling control device includes: a switching valve having a plurality of coolant outlets through which a coolant flows; a plurality of coolant transporting units disposed in contact with the switching valve and configured to be connected to or shut off from the plurality of coolant outlets; and an electric motor configured to switch between connecting and shutting off the plurality of coolant outlets and the plurality of coolant transporting units by operation of the switching valve. The cooling control device further includes a function determination unit configured to determine whether an operating function of the switching valve is decreased; and a first controller configured to set a first current value to a value higher than a second current value. The first current value is an amount of current applied to the electric motor to operate the switching valve after the function determination unit determines that the operating function of the switching valve is decreased. The second current value is an amount of current applied to the electric motor to operate the switching valve after the function determination unit determines that the operating function of the switching valve is not decreased.

An aspect of the present invention provides a cooling control device includes: a switching valve having a plurality of coolant outlets through which a coolant flows; a plurality of coolant transporting units disposed in contact with the switching valve and configured to be connected to or shut off from the plurality of coolant outlets; and an electric motor configured to switch between connecting and shutting off the plurality of coolant outlets and the plurality of coolant transporting units by operation of the switching valve. The cooling control device further includes circuitry configured to determine whether an operating function of the switching valve is decreased. The circuitry is configured to set a first current value to a value higher than a second current value. The first current value is an amount of current applied to the electric motor to operate the switching valve after the function determination unit determines that the operating function of the switching valve is decreased. The second current value is an amount of current applied to the electric motor to operate the switching valve after the function determination unit determines that the operating function of the switching valve is not decreased.

DETAILED DESCRIPTION

Hereinafter, an example in which a cooling control device of the present invention is provided in a vehicle will be described with reference to the drawings. Note that the following description is directed to an illustrative example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the disclosure are optional and may be provided on an as-needed basis. The drawings are schematic and are not intended to be drawn to scale.

The switching valve described in JP-A No. 2014-9668 has a problem in that the function of removing foreign matter may be insufficient because foreign matter is washed away with coolant passing through the inside.

It is desirable to provide a cooling control device that improves removal of foreign matter in a switching valve.

Figure 1:
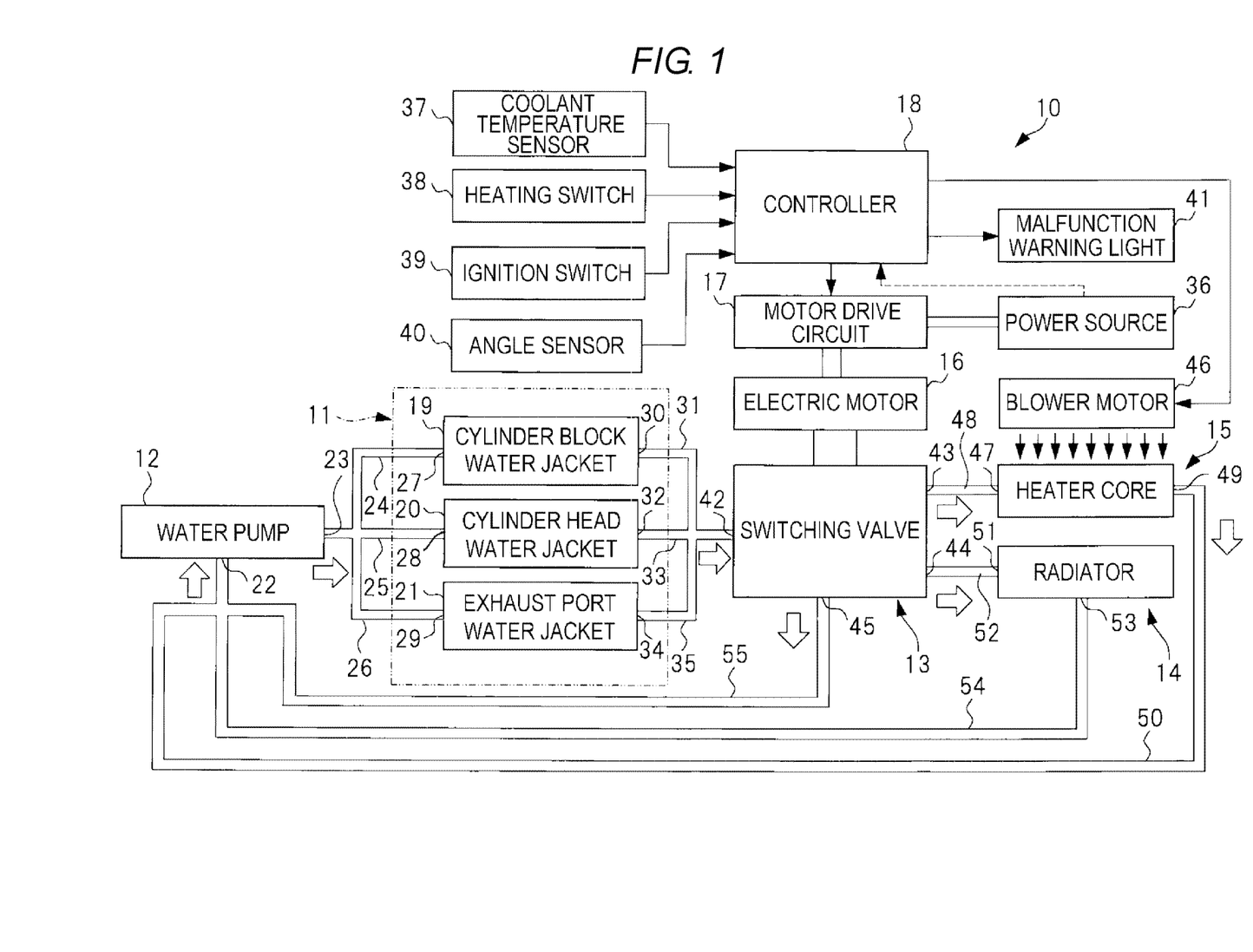
FIG. 1 is a schematic diagram illustrating a vehicle having a cooling control device of the present invention.

A vehicle 10, shown in FIG. 1, includes an engine 11, a water pump 12, a switching valve 13, a radiator 14, a heater core 15, an electric motor 16, a motor drive circuit 17, and a controller 18.

The engine 11 is a power source that generates torque to be transmitted to drive wheels of the vehicle 10, and the engine 11 may be anyone of a gasoline engine, a diesel engine, or a liquefied propane gas engine. The engine 11 burns fuel in a combustion chamber and converts thermal energy during burning of the fuel into kinetic energy of a crankshaft. The engine 11 has a cylinder block water jacket 19, a cylinder head water jacket 20, and an exhaust port water jacket 21. The cylinder block water jacket 19 is provided in a cylinder block of the engine 11, and the cylinder head water jacket 20 is provided in a cylinder head of the engine 11.

An exhaust pipe is provided to which flow from the combustion chamber is connected and a cylinder portion that supports the exhaust pipe is provided in the cylinder head. The exhaust port water jacket 21 is provided in the cylinder portion. The cylinder block water jacket 19, the cylinder head water jacket 20, and the exhaust port water jacket 21 are passages for coolant.

The water pump 12 has a suction port 22 and a discharge port 23, and is driven by a rotational force transmitted from the crankshaft to draw in and discharge coolant. The discharge port 23 is branched and connected to three cooling passages 24, 25, 26. The cooling passage 24 is connected to an inlet 27 of the cylinder block water jacket 19. The cooling passage 25 is connected to an inlet 28 of the cylinder head water jacket 20. The cooling passage 26 is connected to an inlet 29 of the exhaust port water jacket 21.

An outlet 30 of the cylinder block water jacket 19 is connected to the cooling passage 31. An outlet 32 of the cylinder head water jacket 20 is connected to the cooling passage 33. An outlet 34 of the exhaust port water jacket 21 is connected to the cooling passage 35.

Figure 3:
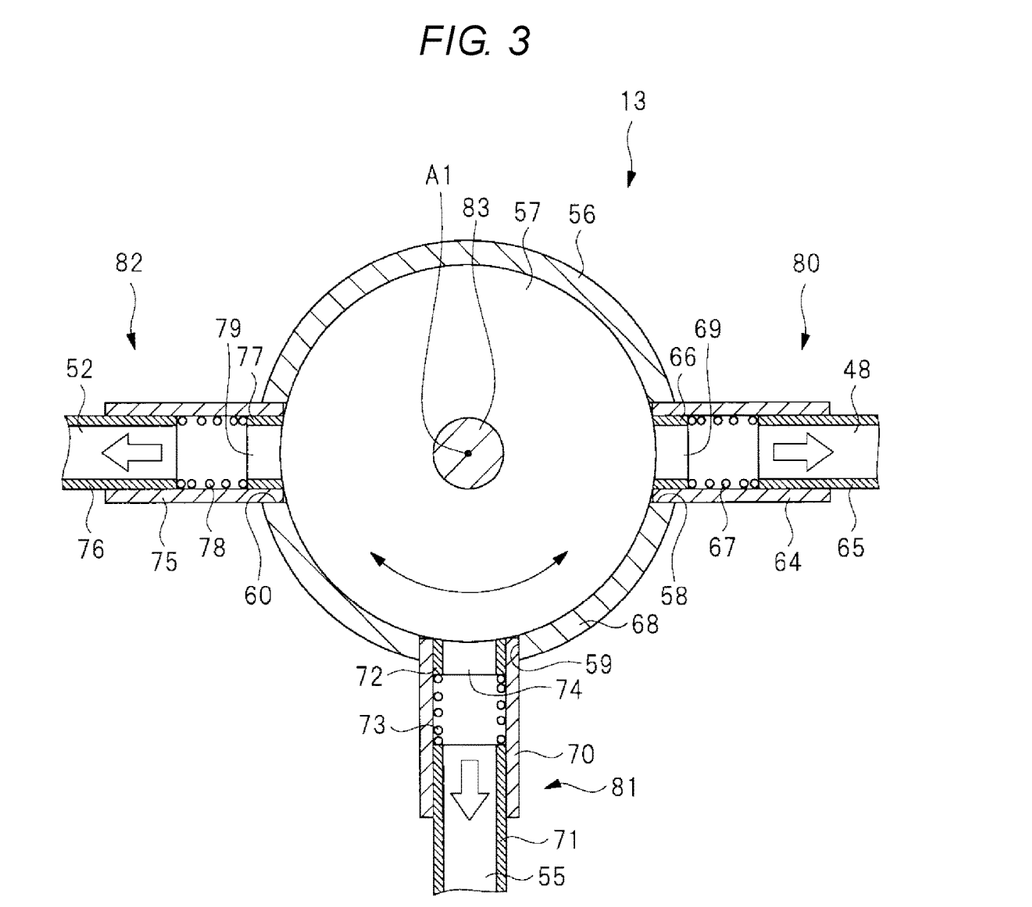
FIG. 3 is a horizontal cross-sectional view illustrating the switching valve.

The electric motor 16 can rotate a rotating shaft 83, illustrated in FIG. 3, by applying current to the electric motor 16. The electric motor 16 can, for instance, use a three-phase AC type stepping motor. The electric motor 16 has a stator and a rotor, and the stator comprises windings for carrying current. The rotor is attached to the rotating shaft 83. The vehicle 10 has a power source 36. The power source 36 is a rechargeable battery that can be charged and discharged. The motor drive circuit 17 electrically connects and cuts off the power source 36 and the electric motor 16. The motor drive circuit 17 is composed of an inverter having a plurality of switching elements. The switching elements are semiconductor devices.

The controller 18 is activated by current applied from the power source 36 and outputs a signal for controlling the motor drive circuit 17. The controller 18 is a microcomputer (i.e., an electronic control device) having an input port, an output port, a memory unit, a processor, and a timer. By controlling a duty ratio of signal input from the controller 18 to the motor drive circuit 17, voltage and current applied to windings of the electric motor 16 are controlled. By switching the direction of current flowing through windings of the electric motor 16, the rotational direction of the rotating shaft 83 of the electric motor 16 is switched. By controlling the on-ratio (i.e., the duty ratio) of the switching elements of the motor drive circuit 17, rotation speed and torque of the electric motor 16 per unit of time can be controlled.

Signals from a coolant temperature sensor 37, a heating switch 38, an ignition switch 39, and an angle sensor 40 are input to the controller 18. The coolant temperature sensor 37 detects the temperature of coolant supplied to the cylinder block water jacket 19, the cylinder head water jacket 20, and the exhaust port water jacket 21, and outputs a signal. The heating switch 38 is switched on and off by an occupant of the vehicle 10. The ignition switch 39 is switched on and off by the occupant or according to a status of the vehicle 10. When the ignition switch 39 is turned on, the crankshaft of the engine 11 rotates, and torque can be transmitted to the drive wheels of the vehicle 10. When the ignition switch 39 is turned off, the engine 11 stops.

The angle sensor 40 detects the rotation angle of a valve body 57 connected to the rotating shaft 83 of the electric motor 16 via a gear (not shown), and outputs a signal. For the angle sensor 40, a magnetic sensor, for instance, can be used. A malfunction warning light 41 is provided in the interior of the vehicle 10 and is visible to the occupant of the vehicle 10. The malfunction warning light 41 turns on when the switching valve 13 is malfunctioning and turns off when the switching valve 13 is normal.

The switching valve 13 comprises one input port 42 into which coolant flows and three output ports 43, 44, 45, from which coolant flows out. The input port 42 branches in three directions and is connected to the output ports 43, 44, 45. The cooling passages 31, 33, 35 are connected in parallel with the input port 42.

A blower motor 46 is provided which is driven and stopped by the controller 18. The heater core 15 is provided in a passage for air transported by the blower motor 46. The heater core 15 is a heat exchanger for warming air for air conditioning, and the heater core 15 forms a passage for coolant. An inlet 47 of the heater core 15 is connected to the output port 43 of the switching valve 13 via a cooling passage 48. An outlet 49 of the heater core 15 is connected to the suction port 22 of the water pump 12 via a cooling passage 50.

The radiator 14 is disposed in the front of an engine room of the vehicle 10. The radiator 14 reduces the temperature of coolant by performing heat exchange between the coolant and the air. An inlet 51 of the radiator 14 is connected to a cooling passage 52, and an outlet 53 of the radiator 14 is connected to the suction port 22 of the water pump 12 via a cooling passage 54.

Figure 2:
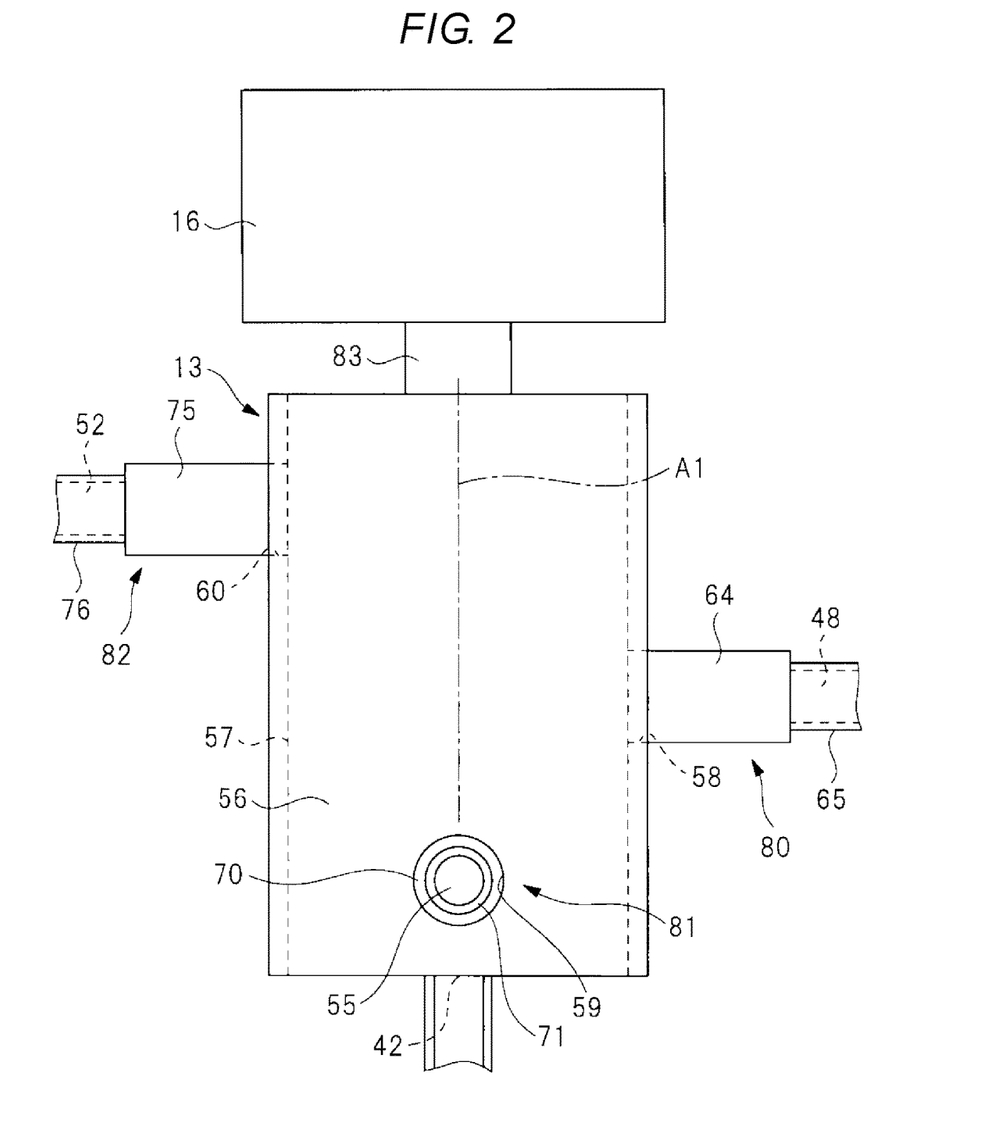
FIG. 2 is a side view illustrating a switching valve of the cooling control device.

A particular configuration of the switching valve 13 will be described with reference to FIGS. 2 and 3. The switching valve 13 has a cylindrical housing 56 and the cylindrical valve body 57 provided in the housing 56. The housing 56 and the valve body 57 are made of metal or synthetic resin. The housing 56 is supported by brackets, frames, etc. of the engine room so that the housing 56 cannot rotate. The valve body 57 is connected to the rotating shaft 83 of the electric motor 16 via a gear (not shown). When the rotational force of the electric motor 16 is transmitted to the valve body 57, it is possible for the valve body 57 to rotate clockwise and counterclockwise about an axial line A1 in FIG. 3. The axial line A1 is the centerline of the valve body 57.

As illustrated in FIG. 3, mounting holes 58, 59, 60 are provided through the housing 56 in a radial direction. The mounting holes 58, 59, 60 are disposed in different peripheral positions of the housing 56. FIG. 3 shows an instance in which the mounting holes 58, 59, 60 are disposed at intervals of 90 degrees from each other. Further, as illustrated in FIG. 2, the mounting holes 58, 59, 60 are disposed in different positions along the axial line A1 direction of the housing 56. FIG. 2 shows an instance in which the mounting hole 58 is disposed between the mounting hole 59 and the mounting hole 60.

Figure 4:
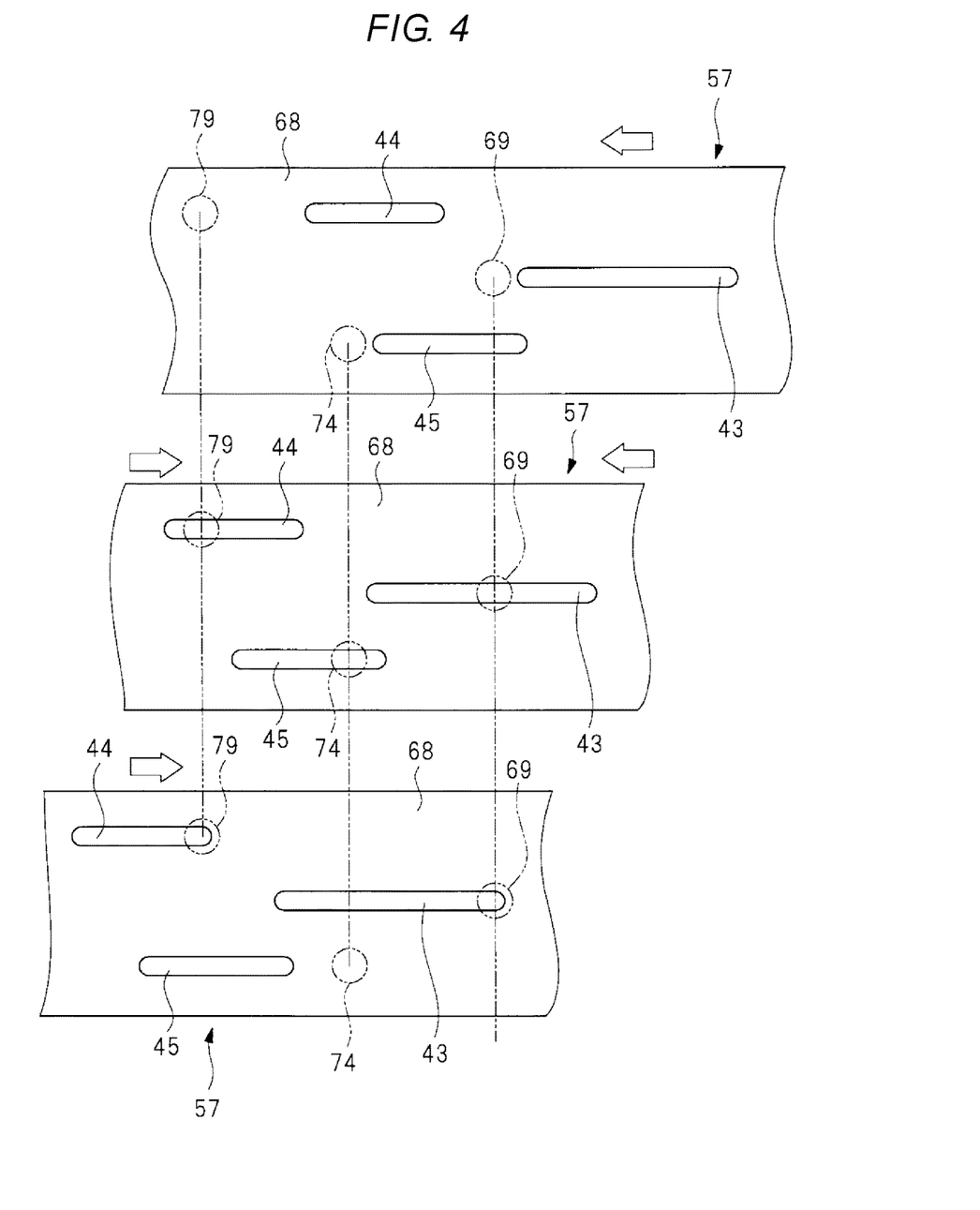
FIG. 4 is an exploded view illustrating an operation of a valve body of the switching valve.

As illustrated in FIG. 4, the output ports 43, 44, 45 are provided on an outer peripheral surface 68 of the valve body 57. Each output port 43, 44, 45 is a groove provided over a predetermined range in the rotational direction of the valve body 57. The output ports 43, 44, 45 are disposed at different positions along the axial line A1 direction and different ranges in the rotational direction of the valve body 57. When the valve body 57 is viewed from the side, each of the output ports 43 44, 45 include a portion inclined with respect to the axial line A1. The valve body 57 has passages connecting the input port 42 to each of the output ports 43, 44, 45.

As illustrated in FIG. 3, a connecting pipe 64 is inserted into the mounting hole 58 and is fixed to the housing 56. Further, a sealing member for sealing the space between the housing 56 and the connecting pipe 64 is provided. A transport pipe 65 is connected to the connecting pipe 64, and a cooling passage 48 is provided inside the transport pipe 65. A sealing member 66 is disposed inside the connecting pipe 64. The sealing member 66 is made of synthetic rubber and has a cylindrical shape. A spring 67 is disposed inside the connecting tube 64 and the spring 67 presses the sealing member 66 against the outer peripheral surface 68 of the valve body 57. A port 69 is formed in the sealing member 66, and the port 69 is connected to the cooling passage 48.

In the axial line A1 direction of the valve body 57, the disposed range of the port 69 and the disposed range of the output port 43 illustrated in FIG. 4 at least partially overlap with each other. Further, the inner diameter of the sealing member 66 is larger than the width of the output port 43 in the axial line A1 direction. As the valve body 57 rotates, the port 69 is connected or shut off from the output port 43.

As illustrated in FIG. 3, the sealing member 66 contacts the outer peripheral surface 68 of the valve body 57 to form a sealing surface. The sealing member 66 prevents leakage of coolant delivered from the input port 42 to the port 69 from between the sealing member 66 and the outer peripheral surface 68 of the valve body 57. The sealing member 66, the connecting pipe 64, and the transport pipe 65 constitute a coolant transporting unit 80.

A connecting pipe 70 is inserted into the mounting hole 59 and is fixed to the housing 56. Further, a sealing member for sealing the space between the housing 56 and the connecting pipe 70 is provided. A transport pipe 71 is connected to the connecting pipe 70, and a bypass passage 55 is provided inside the transport pipe 71. A sealing member 72 is disposed inside the connecting pipe 70. The sealing member 72 is made of synthetic rubber and has a cylindrical shape. A spring 73 is disposed inside the connecting tube 70 and the spring 73 presses the sealing member 72 against the outer peripheral surface 68 of the valve body 57. A port 74 is formed in the sealing member 72 and the port 74 is connected to the bypass passage 55. In the axial line A1 direction, the disposed range of the port 74 and the disposed range of the output port 45 illustrated in FIG. 4 at least partially overlap with each other. Further, the inner diameter of the sealing member 72 is larger than the width of the output port 45 in the axial line A1 direction. As the valve body 57 rotates, the port 74 is connected or shut off from the output port 45.

As illustrated in FIG. 3, the sealing member 72 contacts the outer peripheral surface 68 of the valve body 57 to form a sealing surface. The sealing member 72 prevents leakage of coolant delivered from the input port 42 to the port 74 from between the sealing member 72 and the outer peripheral surface 68 of the valve body 57. The sealing member 72, the connecting pipe 70, and the transport pipe 71 constitute a coolant transporting unit 81.

A connecting pipe 75 is inserted into the mounting hole 60 and is fixed to the housing 56. Further, a sealing member for sealing the space between the housing 56 and the connecting pipe 75 is provided. A transport pipe 76 is connected to the connecting pipe 75, and the cooling passage 52 is provided in the transport pipe 76. A sealing member 77 is disposed inside the connecting pipe 75. The sealing member 77 is made of synthetic rubber and has a cylindrical shape. A spring 78 is disposed inside the connecting tube 75 and the spring 78 presses the sealing member 77 against the outer peripheral surface 68 of the valve body 57. A port 79 is formed in the sealing member 77, and the port 79 is connected to the cooling passage 52. In the axial line A1 direction, the disposed range of the port 79 and the disposed range of the output port 44 illustrated in FIG. 4 at least partially overlap with each other. Further, the inner diameter of the sealing member 77 is larger than the width of the output port 44 in the axial line A1 direction. As the valve body 57 rotates, the port 79 is connected or shut off from the output port 44.

As illustrated in FIG. 3, the sealing member 77 contacts the outer peripheral surface 68 of the valve body 57 to form a sealing surface. The sealing member 77 prevents leakage of coolant delivered from the input port 42 to the port 79 from between the sealing member 77 and the outer peripheral surface 68 of the valve body 57. The sealing member 77, the connecting pipe 75, and the transport pipe 76 constitute a coolant transporting unit 82.

A function of the vehicle 10 illustrated in FIG. 1 will be described. When the ignition switch 39 is turned on and the crankshaft of the engine 11 rotates, the water pump 12 is driven by the rotational force of the crankshaft. The water pump 12 draws in coolant from the suction port 22 and discharges coolant from the discharge port 23. A part of the coolant discharged from the discharge port 23 passes through the cooling passage 24, the cylinder block water jacket 19, and the cooling passage 31, and is delivered to the input port 42 of the switching valve 13. A part of the coolant discharged from the discharge port 23 passes through the cooling passage 25, the cylinder head water jacket 20, and the cooling passage 33, and is delivered to the input port 42 of the switching valve 13. A part of the coolant discharged from the discharge port 23 passes through the cooling passage 26, the exhaust port water jacket 21, and the cooling passage 35, and is delivered to the input port 42 of the switching valve 13.

The controller 18 is activated irrespective of the ON/OFF status of the ignition switch 39. The controller 18 controls the switching valve 13 based on an input signal and information stored in a storage device. Specifically, a signal to be given to the motor drive circuit 17, a duty ratio of a PWM signal for instance, is controlled and the position of the valve body 57 of the switching valve 13 is changed and stopped between a first position and a third position. The controller 18 can process a signal of the angle sensor 40 to determine the rotational position of the valve body 57.

The controller 18 selects the first position when following warm-up conditions for the engine 11 are satisfied. For instance, the ignition switch 39 is turned on to start the engine 11, the heating switch 38 is turned off, and the temperature of coolant detected by the coolant temperature sensor 37 is equal to or less than a predetermined temperature. When the controller 18 stops the valve body 57 of the switching valve 13 at the first position illustrated in the upper part of FIG. 4, the port 69 and the output port 43 are shut off from each other, the port 74 and the output port 45 are shut off from each other, and the port 79 and the output port 44 are shut off from each other. That is, coolant delivered to the switching valve 13 is not delivered to the radiator 14, the heater core 15, and the bypass passage 55.

Figure 5:
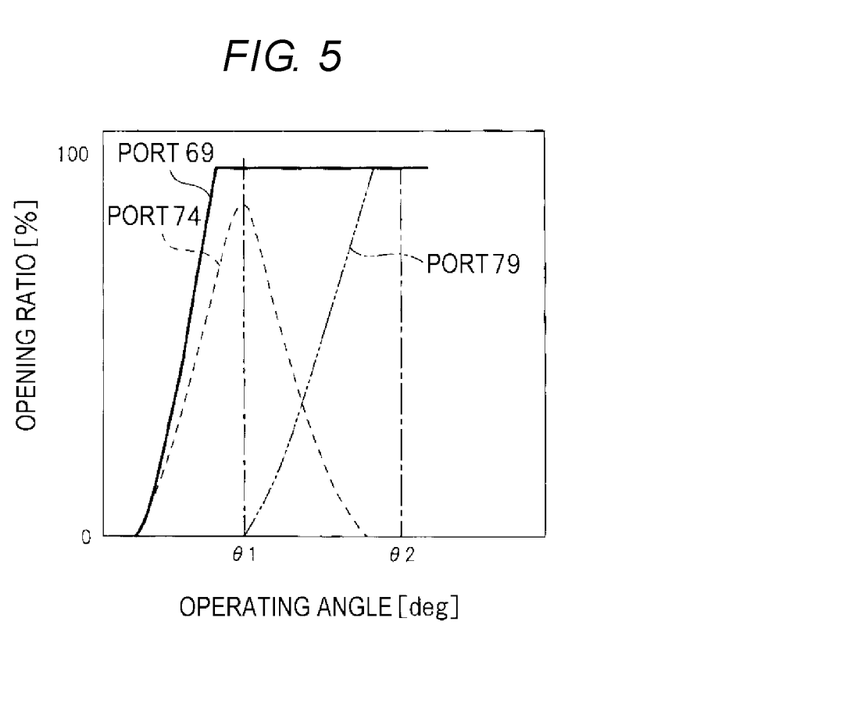
FIG. 5 is a chart illustrating a relationship between operating angles of the valve body and opening ratios of ports.

FIG. 5 is a chart illustrating an example of a relationship between operating angles of the valve body 57 and opening ratios of the port 69, 74, 79. The opening ratio of the port 69 is the proportion of the area of the port 69 that is connected to the output port 43. The opening ratio of the port 74 is the proportion of the area of the port 74 that is connected to the output port 45. The opening ratio of the port 79 is the proportion of the area of the port 79 that is connected to the output port 44. An operating angle of 0 degrees corresponds to the first position of the valve body 57. When the operating angle of the valve body 57 is 0 degrees, the opening ratios of the ports 69, 74, 79 are all 0%.

When the controller 18 detects that the heating switch 38 is on, the controller 18 can control the switching valve 13 to operate the valve body 57 from the first position and stop at the second position. The valve body 57 operates in, for instance, a clockwise direction in FIG. 3. In this case, the valve body 57 moves to the left in FIG. 4, the port 69 connects with the output port 43, and the port 74 connects with the output port 45. After the valve body 57 starts operating from the first position, the opening ratio of the port 69 and the opening ratio of the port 74 increase until the position of the valve body 57 reaches the operating angle θ1. The operating angle θ1 corresponds to the second position of the valve body 57.

When the controller 18 processes the signal of the coolant temperature sensor 37 and determines that the condition for suppressing a temperature increase of the coolant is satisfied, the controller 18 can control the switching valve 13 to switch the position of the valve body 57 from the second position to the third position. The third position of the valve body 57 corresponds to the operating angle θ2 in FIG. 5. While the valve body 57 operates from the second position to the third position, the port 69 is connected to the output port 43, the port 74 is connected to the output port 45, and the port 79 connects to the output port 44, as illustrated in the middle of FIG. 4. Further, the opening ratio of the port 74 decreases for angles greater than or equal to the operating angle θ1 of the valve body 57.

Further, before the valve body 57 position reaches the operating angle θ2 shown in FIG. 5, the port 74 and the output port 45 are shut off from each other, and when the position of the valve body 57 reaches the operating angle θ2, the port 69 is connected to the output port 43 and the port 79 is connected to the output port 44 as illustrated in the lower part of FIG. 4. That is, the ports 69, 79 are open together as illustrated in FIG. 5. It should be noted that when the controller 18 rotates the valve body 57 counterclockwise in FIG. 3, the valve body 57 moves from the first position, through the second position, and then to the third position. Further, the controller 18 may stop the valve body 57 between the first position and the second position or stop the valve body 57 between the second position and the third position.

Figure 6:
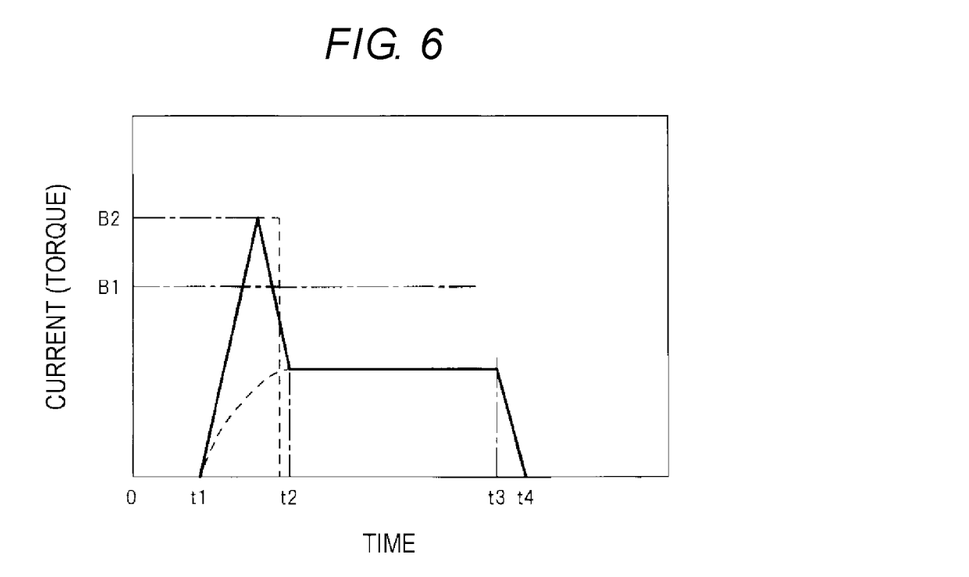
FIG. 6 is a timing chart illustrating an example of changes in current applied to an electric motor of the cooling control device.

Further, when the controller 18 controls the switching valve 13 to operate the stopped valve body 57, current applied to the electric motor 16 can be restricted in order to suppress a sudden surge of current into the controller 18. FIG. 6 is a chart illustrating an example of current applied to the electric motor 16. When current is applied to the electric motor 16 from time t1, the current is controlled, for instance, as indicated by the dashed line such that current applied between time t1 and time t2 is less than a predetermined value B1. The predetermined value B1 is, for instance, 7.1 amperes. In this way, it is possible to suppress incoming current to the controller 18 that gives a signal to the motor drive circuit 17 and protect the controller 18. After time t2, current applied is almost constant. When the signal for stopping the electric motor 16 is output at time t3, current applied to the electric motor 16 reaches a minimum value at time t4.

When the stopped electric motor 16 is rotated and current applied to the electric motor 16 is not restricted, current applied to the electric motor 16, for instance, changes as indicated by the solid line from time t1 to time t2. The maximum value of current applied to the electric motor 16 becomes a predetermined value B2 that exceeds the predetermined value B1.

Incidentally, there is a possibility that the function of the switching valve 13 is decreased by foreign matter contained in the coolant. For instance, if foreign matter is trapped between at least one of the sealing members 66, 72, 77 and the outer peripheral surface 68 of the valve body 57, the operational responsiveness of the valve body 57 may be decreased.

Figure 7:
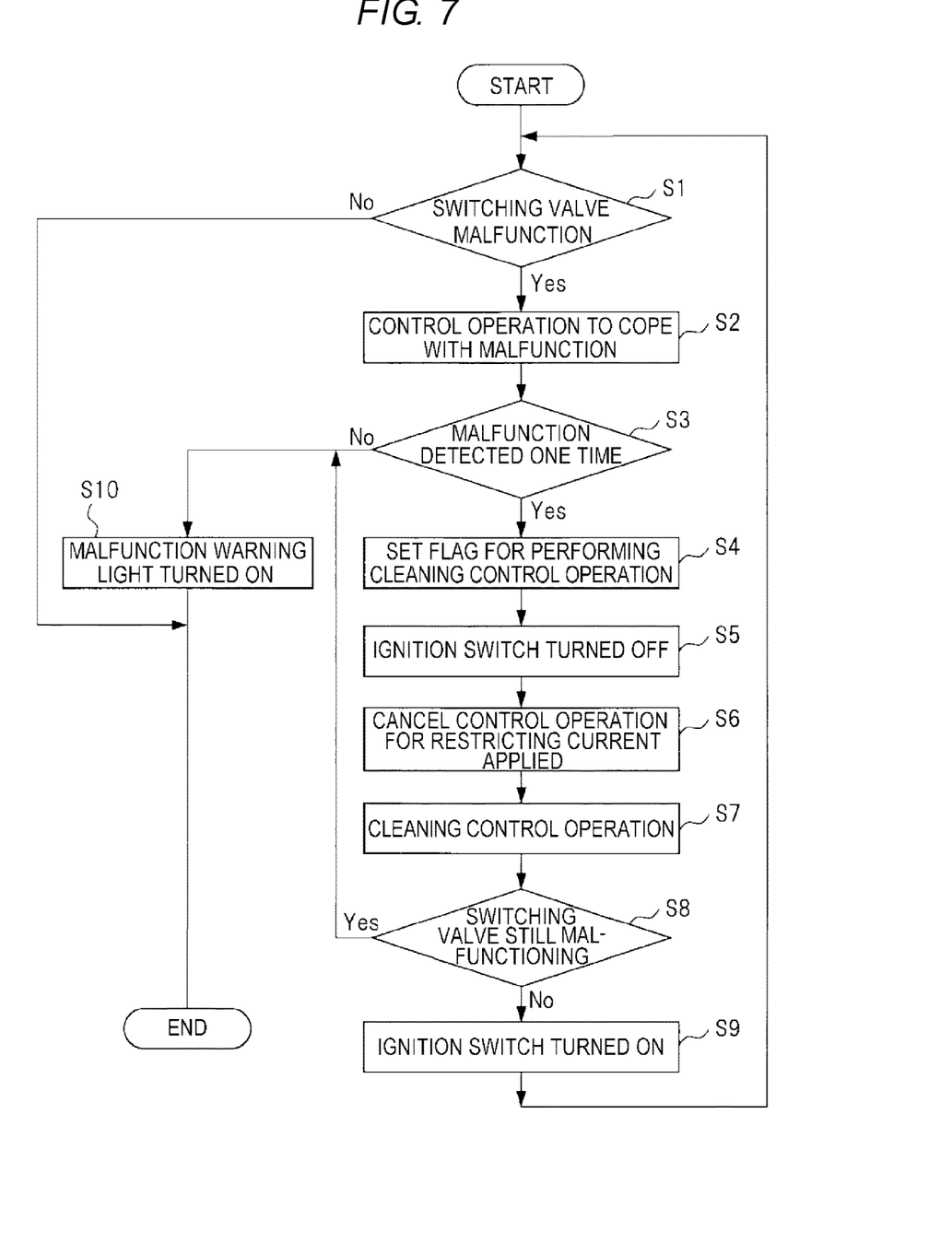
FIG. 7 is a flowchart illustrating an example of a control operation that can be executed by the cooling control device.

The controller 18 may implement an example control operation of FIG. 7 to suppress decrease in the operational responsiveness of the valve body 57. In step S1, the controller 18 determines whether the switching valve 13 is malfunctioning. The controller 18 determines whether the switching valve 13 is malfunctioning by comparing the elapsed time with a target period. The elapsed time is the actual time required from outputting the signal that operates the valve body 57 until the valve body 57 reaches a target position. The target period is stored in advance in the controller 18 in accordance with variations in the operating angle of the valve body 57.

In step S1, a Yes determination of the controller 18 means that the operating function of the valve body 57 of the switching valve 13 is decreased by foreign matter. When a Yes determination is made in step 1, the controller 18 proceeds to step S2 and performs a control operation to cope with malfunctioning of the switching valve 13. This control operation is a control operation in which the position of the valve body 57 is set to the third position regardless of various conditions, for instance, the signal of the coolant temperature sensor 37 or the signal of the heating switch 38.

In step S3, the controller 18 determines whether the number of times the switching valve 13 has been detected to be malfunctioning is one. When the controller 18 determines Yes in step S3, it sets a flag for performing a control operation for cleaning the switching valve 13 in step S4.

When the controller 18 detects that the ignition switch 39 is turned off in step S5, it proceeds to step S6, cancels a "control operation for restricting current applied to the electric motor 16", and performs the control operation for cleaning the switching valve 13 in step S7. The control operation for cleaning the switching valve 13 alternately switches the rotational direction of the rotation shaft 83 of the electric motor 16 to reciprocate the valve body 57 between the first position and the third position for a predetermined period and then stops the valve body 57 at the third position. That is, the valve body 57 of FIG. 3 is alternately switched between a clockwise rotation and a counterclockwise rotation. By doing so, foreign matter held between at least one of the sealing members 66, 72, 77 and the outer peripheral surface 68 of the valve body 57, foreign matter fixed to at least one of the sealing members 66, 72, 77, and foreign matter fixed to the outer peripheral surface 68 of the valve body 57 is removed. In particular, the controller 18 performs a control operation of step S7 while "canceling the control operation for restricting current applied to the electric motor 16". In this way, when the controller 18 operates the valve body 57 in step S7, current applied to the electric motor 16 is not restricted. For instance, current applied to the electric motor 16 is controlled as illustrated by the solid line between time t1 and time t2 in FIG. 6. Consequently, torque of the rotation shaft 83 of the electric motor 16 can be made higher than the torque of the rotation shaft 83 when current applied is restricted. As a result, the operating speed of the valve body 57 becomes higher than the operating speed of the valve body 57 when current applied is restricted and foreign matter can be easily removed.

In step S7, even if a cleaning control operation is performed in which current applied to the electric motor 16 is not restricted, there are cases in which the valve body 57 cannot reciprocate as instructed because trapped foreign matter cannot be removed, and so on. In these cases, if current applied to the electric motor 16 is continuously supplied at the predetermined value B2, which is the largest value, secondary damage, such as disconnection, may occur in the electric motor 16.

Therefore, the controller 18 determines whether the switching valve 13 is still malfunctioning in step S8, which follows step S7. The determination in step S8 is made based on, for instance, whether the valve body 57 rotates when the cleaning control operation of step S7 is continuously performed for a predetermined period of time with the control operation for restricting current applied to the electric motor 16 being canceled. When the valve body 57 rotates, the controller 18 makes a No determination in step S8, proceeds to step S9, detects that the ignition switch 39 is turned on, and then proceeds to step S1.

If the valve body 57 does not rotate in step S8, the controller 18 makes a Yes determination in step S8, turns on the malfunction warning light 41 in step S10, and then ends the example control operation of FIG. 7. The controller 18 also maintains control of stopping the valve body 57 at the third position in step S10. As a result, coolant cooled by the radiator 14 is delivered to the engine 11 through the water pump 12. Further, when a No determination is made in step S3, the controller 18 proceeds to step S10.

When the valve body 57 does not rotate even if the cleaning control operation is continued for a predetermined period of time while the control operation for restricting current applied to the electric motor 16 is canceled, current applied to the electric motor 16 is shut down after current is continuously applied at the predetermined value B2, which is the maximum value, for a predetermined period of time, as indicated by the dashed line in FIG. 6.

When the controller 18 makes a No determination in step S1, none of the operations in step S2 through step S9 are performed nor is the determination re-performed, and the example control operation of FIG. 7 ends. That is, the controller 18 limits current applied to the electric motor 16 to less than the predetermined value B1 when operating the stopped valve body 57.

When the ignition switch 39 is turned off and the engine 11 is stopped, the controller 18 performs the control operation to clean the switching valve 13. As a result, it is possible to suppress influences to coolant performance of the engine 11 and heating function of the heaters, and suppress a decrease in drivability of the vehicle 10.

When the switching valve 13 operates the valve body 57 between the first position and the third position, that is, when the valve body 57 is alternately rotated clockwise and counterclockwise as in FIG. 3, the operating angles of the valve body 57 are determined by the respective positions of the ports 69, 74, 79 and the respective disposed ranges of the output ports 43 44, 45, in the valve body 57 rotational direction, and so on.

When the matters in the present example are described, the output ports 43, 44, 45 are examples of coolant outlets, the engine 11 is an example of a part to be cooled, and the angle sensor 40 and controller 18 constitute an example of a function determination unit. The controller 18 and the motor drive circuit 17 constitute an example of the first controller, a second controller, and a third controller, and the controller 18 is a number-of-times determination unit. The water pump 12 is an example of a pump, and the coolant transporting unit 82 is a coolant transporting unit connected to the radiator. A rotating function of the valve body 57 is an example of an operating function of the switching valve.

The current value indicated by the solid line, which is applied to the electric motor 16 between time t1 and time t2 in FIG. 6, is an example of a first current value. The current value, indicated by the dashed line, applied to the electric motor 16 between the time t1 and the time t2 in FIG. 6 is an example of a second current value. A number of malfunctions detected of one is an example of a predetermined number of times. The output port 44 is an example of one of a plurality of coolant outlets. Malfunctioning of the switching valve 13 corresponds to a decrease in the operating function of the switching valve 13, specifically, a decrease in the operating responsiveness of the valve body 57. Further, the valve body 57 can be operated even if the operating function of the switching valve 13 is decreased.

The cooling control device and the switching valve are not limited to the above-described example, and can be changed in various ways without deviating from the gist thereof. The number of coolant outlets and the number coolant transporting units provided in the switching valve can be changed to any number. Further, the operating position of the valve body 57 can be set such that coolant of the input port 42 is delivered only to the bypass passage 55 and not to the cooling passages 48, 52. Further, the operating position of the valve body 57 can be set such that coolant of the input port 42 is delivered only to the cooling passage 48 and not to the cooling passage 52 and the bypass passage 55. Further, the operating position of the valve body 57 can be set such that coolant of the input port 42 is delivered to the cooling passage 52 and the bypass passage 55 and not to the cooling passage 48.

The plurality of coolant outlets may also be provided on an end surface perpendicular to the axial line of the valve body, further to the outer peripheral surface of the cylindrical valve body. In this case, each of the plurality of coolant outlets is disposed on different circumferences with the axial line of the valve body at the center. The plurality of coolant transporting units also contact end surfaces perpendicular to the axial line of the valve body.

Further, the valve body may be rotatable around the axial line of the valve body and may be spherical instead of cylindrical. Further, the number of malfunction detections used in the determination of step S3 of FIG. 7 can be changed to any number. The first controller, the second controller, the third controller, the function determination unit, and the number-of-times determination unit may each be a standalone electrical or electronic component, or may constitute a unit having a plurality of electrical or electronic components. Electrical or electronic components include processors, control circuits, and modules.

According to the present invention, the force for operating the switching valve after the operating function of the switching valve is determined to be decreased becomes greater than the force for operating the switching valve after it is determined that the operating function of the switching valve is not decreased. In this way, when the operating function of the switching valve is decreased by foreign matter, the foreign matter can be removed.

The invention claimed is:

1. A cooling control device, comprising:
a switching valve having a plurality of coolant outlets through which a coolant flows;
a plurality of coolant transporting units disposed in contact with the switching valve and configured to be connected to or shut off from the plurality of coolant outlets, the plurality of coolant transporting units being configured to deliver coolant to at least one part to be cooled, the at least one part to be cooled including an engine that transmits torque to drive wheels of a vehicle;
an electric motor configured to switch between connecting and shutting off the plurality of coolant outlets and the plurality of coolant transporting units by operation of the switching valve wherein any one of the coolant transporting units is connected to a radiator that cools the coolant and delivers the coolant to the engine;
a water pump configured to deliver the coolant from the plurality of coolant transporting unit to the engine;
a function determination unit configured to determine whether an operating function of the switching valve is decreased;
a first controller configured to set a first current value to a value higher than a second current value, the first current value being an amount of current applied to the electric motor to operate the switching valve after the function determination unit determines that the operating function of the switching valve is decreased, the second current value being an amount of current applied to the electric motor to operate the switching valve after the function determination unit determines that the operating function of the switching valve is not decrease; and
a third controller configured to operate the switching valve so as to connect any one of the plurality of coolant outlets with the coolant transporting unit connected to the radiator and before the first controller operates the switching valve after the function determination unit determines that the operating function of the switching valve is decreased.

2. The cooling control device according to claim 1, wherein
the switching valve comprises a valve body rotatable with power from the electric motor,
the plurality of coolant outlets are disposed on an outer peripheral surface of the valve body,
the plurality of coolant transporting units are in contact with the outer peripheral surface of the valve body, and
the operating function of the switching valve determined by the function determination unit includes a rotating function of the valve body.

3. The cooling control device according to claim 2, further comprising a second controller configured to alternately switch the rotational direction of the valve body when the first controller rotates the valve body after the function determination unit determines that the rotating function of the valve body is decreased.

4. The cooling control device according to claim 1, wherein
the first controller operates the switching valve while the engine is stopped after the function determination unit determines that the operating function of the switching valve is decreased.

5. The cooling control device according to claim 2, wherein
the first controller operates the switching valve while the engine is stopped after the function determination unit determines that the operating function of the switching valve is decreased.

6. The cooling control device according to claim 3, wherein
the first controller operates the switching valve while the engine is stopped after the function determination unit determines that the operating function of the switching valve is decreased.

7. The cooling control device according to claim 1, wherein,
the cooling control device is further comprises a number-of-times determination unit configured to determine whether a number of times that the operating function of the switching valve is determined to be decreased is equal to or less than a predetermined number of times after the switching valve is operated by the third controller and before the switching valve is operated by the first controller, and
in a case where the number of times that the operating function of the switching valve was determined to be decreased is equal to or less than a predetermined number of times, the first controller operates the switching valve by setting the first current value to be higher than the second current value.

8. The cooling control device according to claim 2, wherein,
the cooling control device is further comprises a number-of-times determination unit configured to determine whether a number of times that the operating function of the switching valve is determined to be decreased is equal to or less than a predetermined number of times after the switching valve is operated by the third controller and before the switching valve is operated by the first controller, and
in a case where the number of times that the operating function of the switching valve was determined to be decreased is equal to or less than a predetermined number of times, the first controller operates the switching valve by setting the first current value to be higher than the second current value.

9. The cooling control device according to claim 3, wherein, the cooling control device is further comprises a number-of-times determination unit configured to determine whether a number of times that the operating function of the switching valve is determined to be decreased is equal to or less than a predetermined number of times after the switching valve is operated by the third controller and before the switching valve is operated by the first controller, and in a case where the number of times that the operating function of the switching valve was determined to be decreased is equal to or less than a predetermined number of times, the first controller operates the switching valve by setting the first current value to be higher than the second current value.

10. The cooling control device according to claim 7, wherein in a case where the number of times that the operating function of the switching valve is determined to be decreased exceeds a predetermined number of times the third controller maintains the connection of the any one of the plurality of coolant outlets to the coolant transporting unit connected to the radiator.

11. The cooling control device according to claim 8, wherein in a case where the number of times that the operating function of the switching valve is determined to be decreased exceeds a predetermined number of times the third controller maintains the connection of the any one of the plurality of coolant outlets to the coolant transporting unit connected to the radiator.

12. The cooling control device according to claim 9, wherein in a case where the number of times that the operating function of the switching valve is determined to be decreased exceeds a predetermined number of times the third controller maintains the connection of the any one of the plurality of coolant outlets to the coolant transporting unit connected to the radiator.

13. A cooling control device, comprising:

a switching valve having a plurality of coolant outlets through which a coolant flows;

a plurality of coolant transporting units disposed in contact with the switching valve and configured to be connected to or shut off from the plurality of coolant outlets, the plurality of coolant transporting units being configured to deliver coolant to at least one part to be cooled, the at least one part to be cooled including an engine that transmits torque to drive wheels of a vehicle;

an electric motor configured to switch between connecting and shutting off the plurality of coolant outlets and the plurality of coolant transporting units by operation of the switching valve wherein any one of the coolant transporting units is connected to a radiator that cools the coolant and delivers the coolant to the engine;

a water pump that configured to deliver the coolant from the plurality of coolant transporting units to the engine; and a circuitry configured to determine whether an operating function of the switching valve is decreased, set a first current value to a value higher than a second current value, the first current value being an amount of current applied to the electric motor to operate the switching valve after the function determination unit determines that the operating function of the switching valve is decreased, the second current value being an amount of current applied to the electric motor to operate the switching valve after the function determination unit determines that the operating function of the switching valve is not decreased, and operate the switching valve so as to connect any one of the plurality of coolant outlets with the coolant transporting unit connected to the radiator and before the first controller operates the switching valve after the function determination unit determines that the operating function of the switching valve is decreased.

* * * * *